United States Patent [19]

Wolfe

[11] Patent Number: 4,470,833
[45] Date of Patent: Sep. 11, 1984

[54] ROLL FILTER METERING ARRANGEMENT

[75] Inventor: James C. Wolfe, Georgetown, Ind.

[73] Assignee: Allis-Chalmers Corp., Milwaukee, Wis.

[21] Appl. No.: 449,472

[22] Filed: Dec. 13, 1982

[51] Int. Cl.³ .................................................. B01D 19/00
[52] U.S. Cl. ........................................ 55/271; 55/354; 335/205
[58] Field of Search ................. 55/351, 352, 354, 271; 210/138, 387; 335/205

[56] References Cited

U.S. PATENT DOCUMENTS

| | | | |
|---|---|---|---|
| 2,268,834 | 1/1942 | Kuperus | 335/205 |
| 2,848,064 | 8/1958 | Gregory | 55/271 |
| 3,175,775 | 3/1965 | Wurlenberg et al. | 55/271 |
| 3,310,931 | 3/1967 | Revell | 55/354 |

FOREIGN PATENT DOCUMENTS 45-5692   7/1970   Japan ..................................... 335/205

Primary Examiner—Bernard Nozick
Attorney, Agent, or Firm—Arthur L. Nelson

[57] ABSTRACT

A metering arrangement for limiting the advance of the filter media in an automatic roll filter having a timer which periodically energizes a drive motor adapted to draw the media through the filtering zone of the apparatus. The arrangement includes a metering reel which is adapted to rotate in direct proportion to the lineal advance of the filter media, a magnet mounted on the reel which generates a magnetic field limited to a predetermined arc of the periphery of the reel, and a reed switch which is actuated by the magnetic field to signal an electrical circuit to shut off the drive motor after a preselected increment of the filter media has been drawn into the filtering zone of the apparatus.

6 Claims, 5 Drawing Figures

ROLL FILTER METERING ARRANGEMENT

BACKGROUND OF THE INVENTION

1. Field of the Invention

The present invention relates to automatic roll filters and in particular to an improved metering apparatus for regulating the advance of the filter media in such devices.

2. Description of the Prior Art

The prior art discloses a variety of metering arrangements for regulating the advance of roll filter media through the filtering zone of an automatic roll filter. For example, U.S. Pat. No. 3,276,191 shows the use of a weighted drive chain adapted to advance clean filter media into the filtering zone upon displacement of a roller mechanically connected with the chain. In that arrangement, the media is drawn over the roller in a fashion, such when the dust loading in the media reaches a predetermined level, the gas pressure on the media causes the media to displace the roller which in turn releases the chain to advance the media. U.S. Pat. No. 3,310,921 shows another metering arrangement wherein a drive motor is connected to suitable timing and dust load sensing circuitry which includes an electrical shut-off switch actuated by a cam adapted to rotate with the movement of the filter media across the filtering zone. Each time the circuitry activates the drive motor, the cam allows the media to advance a predetermined distance into the filtering zone and then actuates the switch to shut off the motor. While mechanical metering arrangements such as the foregoing have proven satisfactory in many applications, experience has shown that they have been susceptible to misadjustment in the field as well as being subjected to the deleterious effects of wear and corrosion of their various components.

SUMMARY OF THE INVENTION

The present invention relates to a metering arrangement for a filter media advance control system in an automatic roll filter apparatus.

The automatic roll filter apparatus in which the switching arrangement is to be used includes a filter housing wherein filter media is drawn off a roll of media on one side of an air filtering zone and rewound on a rewind spool on the other side of the filtering zone. During normal filtering operations, a motor connected to the rewind spool is periodically energized by an electrical circuit connected to the motor to advance new filtering media into the filtering zone.

The metering arrangement embodying the invention is connected with the electrical circuit and is adapted to signal the circuit to turn off the motor to limit the advance of the filter media to preselected increments. The arrangement includes a metering reel mounted within the housing which is adapted to rotate in direct proportion to the lineal advance of the filter media, a magnet mounted on the reel which generates a magnetic field which is limited to a predetermined arc of the periphery of the reel, and a proximity sensor such as a reed switch connected with the electrical circuit mounted in the housing proximate the magnet. This allows measuring the advance of the filter media by monitoring the position of the magnet with the proximity sensor which in turn signals the circuit to shut off the motor when the desired incremental advance has been made.

Considering the foregoing, it can be seen that the invention contemplates a metering arrangement which is easy to adjust and maintain in the field as well as being relatively immune to the wear and corrosion problems encountered with the mechanical devices heretofore in use. However, it is to be understood that various changes can be made in the arrangement, form and construction of the apparatus disclosed herein without departing from the spirit and scope of the invention.

DESCRIPTION OF THE PREFERRED EMBODIMENT

Figure 2:
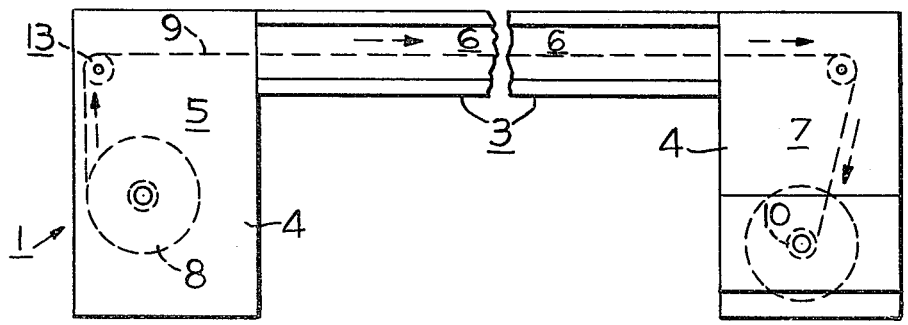
FIG. 2 is a top view of the air filter of FIG. 1 with the path of the filter media advance indicated schematically.
Figure 1:
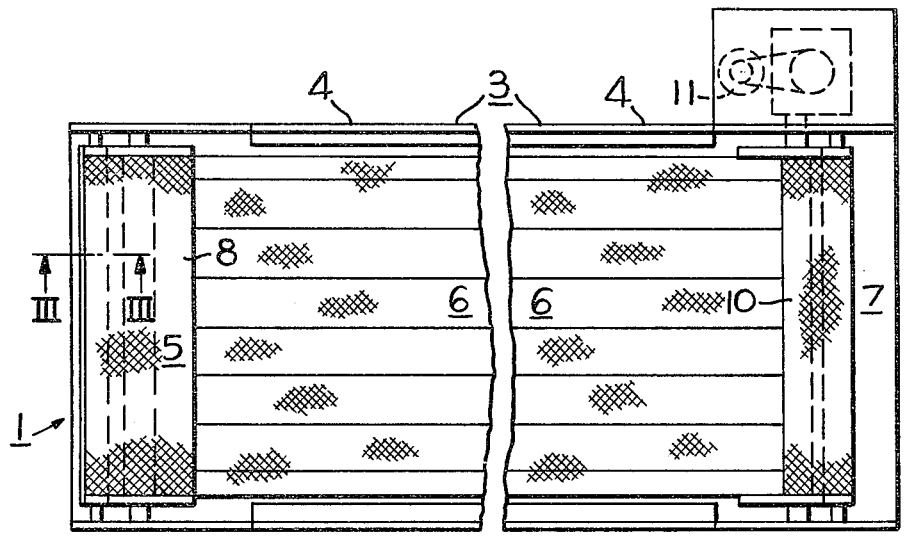
FIG. 1 is a front elevational view of an automatic roll filter apparatus.

As shown in the drawings, the filter media advance control system 1 embodying the metering arrangement 2 of the invention is utilized in an automatic roll filter apparatus 3. The filter apparatus 3 includes a housing 4 having a filter media supply zone 5, a central filtering zone 6, and a filter media rewind zone 7. A roll 8 of tightly wound filter media is mounted in the supply zone 5. The filter media can be any one of a variety of commercially available filtering materials. For example, media formed of an expansible-compressible fiberglass such as that used in the air control unit shown in U.S. Pat. No. 3,310,931 discussed above in regard to the prior art would be suitable for this purpose.

As is well known in the art, during filtering operations, a web of filter media 9 from the roll 8 is advanced incrementally from time to time into and through the central filtering zone 6 where the gas stream flows through the media. As the web of filter media 9 is progressively advanced through the central air filtering zone 6, the web assumes an expanded thickness of comparatively three-dimensional proportion to filter the contaminates from the gas stream. The web 9 is then correspondingly progressively advanced to the rewind zone 7 where it is tightly wound upon a rewind spool 10 driven by a suitable electric motor 11 operatively connected to the rewind spool 10 by a chain and sprocket arrangement or other conventional means. As will be described, the motor 11 is energized by the electrical circuit 12 shown in FIG. 5 to periodically advance the filter media during filtering operations.

Figure 4:
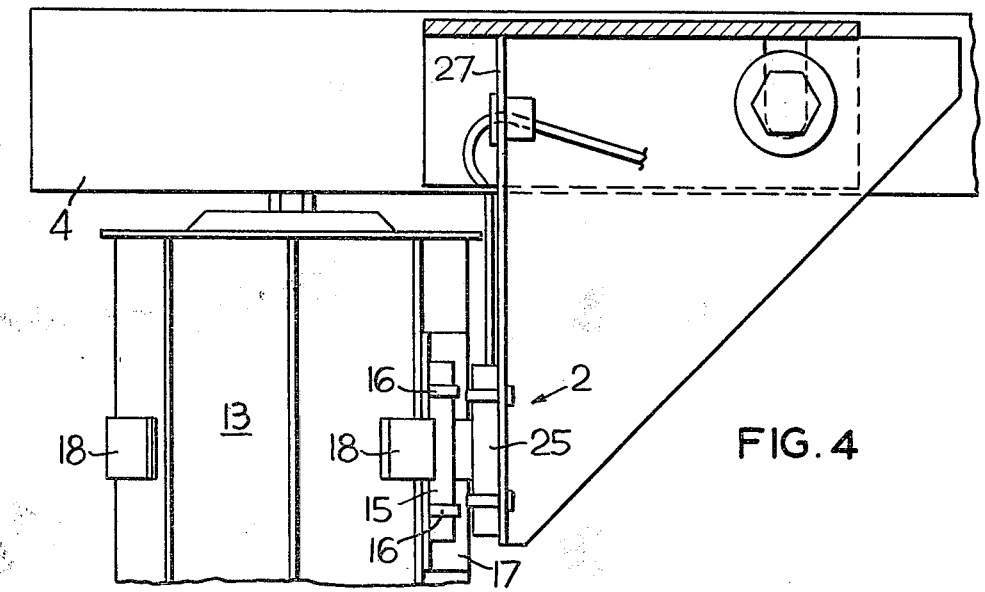
FIG. 4 is a cross-sectional view taken generally along line IV—IV in FIG. 3.
Figure 3:
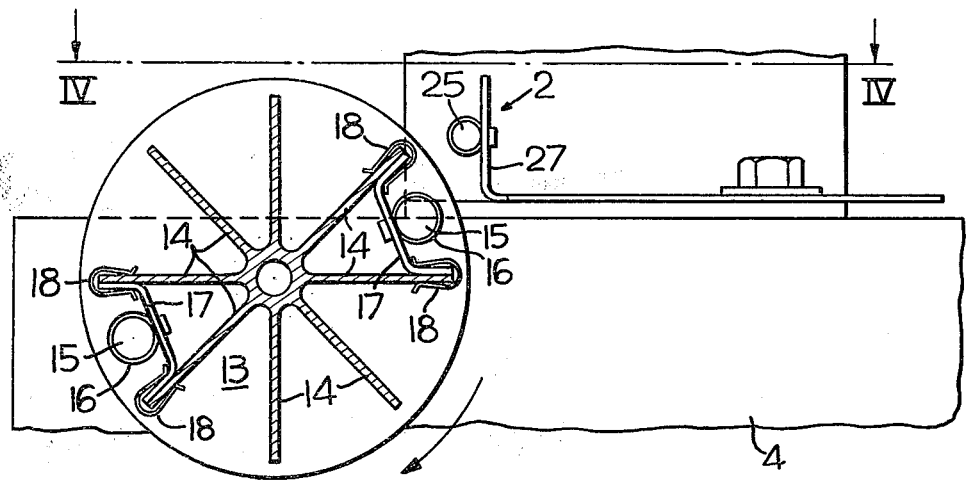
FIG. 3 is an enlarged cross-sectional view taken generally along line III—III in FIG. 1.

Referring to FIGS. 3 and 4, the metering arrangement 2 includes a metering reel 13 rotatably mounted in the supply zone 5 in a suitable form of journal box (not shown). The web of filter media 9 is arranged to pass over the metering reel 13 before the media enters into the central air filtering zone 6. This causes the reel 13 to rotate in direct proportion to the lineal advance of the media into the central air filtering zone 6.

As shown in FIG. 3, the metering reel 13 is of a circular, spider-like, cross-sectional configuration formed by a plurality of outwardly radiating ribs 14 which carry the media as it passes over the reel. This arrangement accommodates securing a pair of magnets 15 adapted to selectively trigger the electrical circuit 12 to control the advance of the filter media into the air filtering zone 6. As can be seen from the drawings, the magnets 15 are secured to one end of the metering reel 13 in radial alignment on opposite sides of the reel. Each of the magnets 15 is affixed by a pair of ties or straps 16 to a generally U-shaped bracket 17 nestled between a pair of adjacent ribs 14 inward of the outer periphery of the reel and releasably secured to the ribs by a pair of spring-loaded clips 18 which clamp the sides of the bracket to the ribs.

Figure 5:
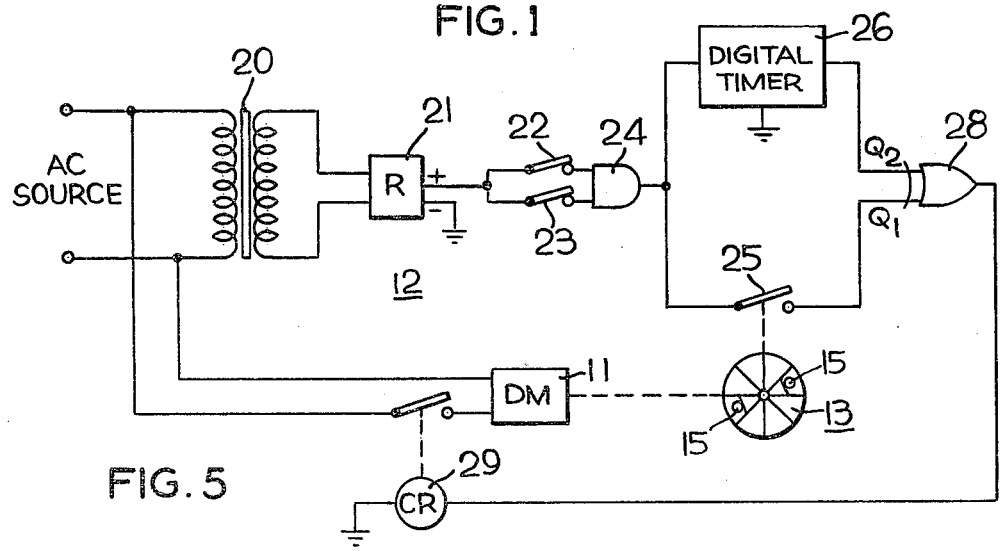
FIG. 5 is an electrical circuit diagram.

Although the metering arrangement 2 can be used with a variety of electrical circuits to control the motor 11, a schematic of one circuit suitable for controlling the motor is shown in FIG. 5. As shown in the drawing, the secondary coil of a transformer 20 is connected to a DC rectifier 21 having one side connected to a normally closed on/off switch 22 and a normally closed media runout switch 23 connected in parallel with the switch 22, both of which are in turn connected to the inputs of an AND gate 24. The runout switch 23 is kept closed during normal filtering operations; however, when all the filter media is drawn off the roll 8 it opens to interrupt the circuit through the switch to the AND gate 24. U.S. Pat. No. 3,350,853 discloses a mechanical runout switch mounted in the supply zone of the filter arrangement shown in that patent which experience has shown to be suitable for this purpose.

The output of the AND gate 24 is connected to a normally open reed switch 25 and a repeating cycle digital timer 26 connected in parallel with the reed switch 25. As best shown in FIG. 3, the reed switch 25 is supported by a bracket 27 mounted on the side of the housing 4. The reed switch 25 is aligned with the magnet 15 and is spaced from the axis of the metering reel 13 at a distance where it will be closed by the magnetic fields generated by the magnets 15 within about a 45 degree arc on either side of the magnets about the periphery of the reel, and open when the reel is rotated so that the reed switch is outside those fields. The reed switch 25 and the timer 26 are in turn connected to the inputs of an EXCLUSIVE/OR gate 28 which has its output connected to one side of the operating coil of a control relay 29 which has its other side connected to the other side of the rectifier 21. As will be described, when the control relay 29 is energized, it completes the circuit from the primary side of the transformer 20 to the motor 11 which begins turning the rewind spool 10 to advance the filter media until the metering arrangement 2 signals the circuit to de-energize the relay.

In the typical roll filter installation, the filter media is advanced about 2½ inches a day. This of course will vary from one installation to the next depending on the quality and quantity of air being cleaned. However, the operating cycle of the advance control system will remain essentially the same.

Assuming the output from the timer 26 is initially "0" with the reed switch 25 open, the $Q_1$ and $Q_2$ inputs into the EXCLUSIVE/OR gate 28 are both "0" so that its output is "0". In this condition, the control relay 29 is de-energized and the motor 11 is off. When the digital timer 26 completes the first half of its timing cycle, its output is switched to "1". With $Q_1$ and $Q_2$ at the EXCLUSIVE/OR gate 28 now "0" and "1", respectively, its output is "1". This results in energization of the control relay 29 which turns on the motor 11 which begins turning the rewind spool 10 to advance the filter media. As the media advances, it turns the metering reel 13 until one of the magnets 15 is moved close enough to the reed switch 25 for its magnetic field to close the switch. When this occurs, $Q_1$ at the EXCLUSIVE/OR gate 28 changes to "1" resulting in the gate's output changing to "0" with the consequent de-energization of the control relay 29 which stops the motor 11. This condition is maintained for the second half of timing cycle. Then, when the timer 26 completes its cycle, its output changes to "0" so $Q_1$ and $Q_2$ at the EXCLUSIVE/OR gate 28 are "1" and "0", respectively. In this condition, the output from the EXCLUSIVE/OR gate 28 is "1" which results in energization of the control relay 29 which turns on the motor 11 to advance the media again. The motor 11 continues to run until the magnets 15 are carried to a position where their magnetic fields no longer affect the reed switch 25 which allows it to open. When this occurs, $Q_1$ changes to "0". Thus, both $Q_1$ and $Q_2$ are "0" so that the output from the EXCLUSIVE/OR gate 28 is again "0" and the control relay 29 is de-energized. This turns off the motor 11 to stop the advance of the filter media and thus completes one cycle of the digital timer.

During normal filtering operations, both the on/off switch 22 and the runout switch 23 are closed. As long as both of these switches are closed, the timer 26 continues to repeat the foregoing cycle to periodically advance the filter media. However, as can be appreciated, if either or both of these switches are opened, the output from the AND gate 24 changes to "0" and the circuit is de-energized.

The embodiments of the invention in which an exclusive property or privilege is claimed are defined as follows:

1. In a filter media advance control system for an automatic roll filter apparatus including a filter housing wherein the filter media is advanced from a supply zone through an air filtering zone and rewound on a rewind spool in a rewind zone including a motor in an electrical circuit, a timer for periodically signaling the circuit to energize the motor to advance the filter media, metering means connected with the electrical circuit responsive to the advance of filter media within the housing signaling the circuit to shut off the motor to limit the advance of the filter media to preselected increments comprising, a metering reel in said metering means secured within the housing for rotation about an axis extending across the interior of the housing adapted to rotate in direct proportion of the lineal advance of the filter media within the housing;

a magnet affixed to said metering reel generating a magnetic field over a predetermined arc of the periphery of said reel;

proximity sensing means including a switch connected with the electrical circuit;

stationary mounting means supporting said sensing means in radial alignment with said magnet at a preselected distance from the axis of said reel; and said sensing means actuated by the magnetic field of said magnet to operate said switch and signal the circuit to shut off the motor at least once during each revolution of the reel.

2. In a filter media advance control system as set forth in claim 1, and said proximity sensing means including a reed switch.

3. In a filter media advance control system as set forth in claim 1, and a pair of said magnets being affixed in radial alignment on opposite sides of the reel.

4. In a filter media advance control system as set forth in claim 1, and
said metering reel being secured in the supply zone of the housing.

5. In a filter media advance control system as set forth in claim 1, and
said metering reel being of a circular, spider-like, cross-sectional configuration formed by a plurality of outwardly radiating rib portions and said magnet being secured between an adjacent pair of said rib portions inward of the outer periphery of the reel.

6. In a filter media advance control system as set forth in claim 5, and
said magnet being affixed within a generally U-shaped bracket nestled between said pair of rib portions, and clip means releasably securing the bracket to said rib portions.

* * * * *